(12) United States Patent
Ball et al.

(10) Patent No.: US 8,570,957 B2
(45) Date of Patent: Oct. 29, 2013

(54) EXTENSION OF POWER HEADROOM REPORTING AND TRIGGER CONDITIONS

(75) Inventors: Carsten Ball, München (DE); Jari Lindholm, Palojoki (FI); Robert Müllner, München (DE); Claudio Rosa, Randers (DE)

(73) Assignee: Nokia Siemens Networks Oy, Espoo (FI)

( * ) Notice: Subject to any disclaimer, the term of this patent is extended or adjusted under 35 U.S.C. 154(b) by 1003 days.

(21) Appl. No.: 12/382,920

(22) Filed: Mar. 26, 2009

(65) Prior Publication Data

US 2009/0245191 A1 Oct. 1, 2009

Related U.S. Application Data

(60) Provisional application No. 61/039,707, filed on Mar. 26, 2008.

(51) Int. Cl.
 *H04L 1/00* (2006.01)
 *H04B 7/00* (2006.01)

(52) U.S. Cl.
 USPC .......................................... 370/329; 455/522

(58) Field of Classification Search
 USPC ........................................................ 370/329
 See application file for complete search history.

(56) References Cited

U.S. PATENT DOCUMENTS

| | | | |
|---|---|---|---|
| 5,491,837 A * | 2/1996 | Haartsen | 455/62 |
| 5,551,057 A * | 8/1996 | Mitra | 455/522 |
| 5,991,618 A * | 11/1999 | Hall | 455/425 |
| 6,075,974 A | 6/2000 | Saints et al. | |
| 6,374,085 B1 * | 4/2002 | Saints et al. | 455/69 |
| 6,975,609 B1 * | 12/2005 | Khaleghi et al. | 370/335 |
| 7,428,426 B2 * | 9/2008 | Kiran et al. | 455/522 |
| 7,860,052 B2 * | 12/2010 | Lohr et al. | 370/329 |
| 7,894,444 B2 | 2/2011 | Lohr et al. | |
| 8,457,676 B2 * | 6/2013 | Michel et al. | 455/522 |
| 2004/0252658 A1 * | 12/2004 | Hosein et al. | 370/328 |
| 2007/0297360 A1 * | 12/2007 | Joachim et al. | 370/329 |
| 2008/0037413 A1 * | 2/2008 | Gu et al. | 370/210 |

(Continued)

FOREIGN PATENT DOCUMENTS

| | | |
|---|---|---|
| CN | 101009933 A | 8/2007 |
| RU | 2236757 C2 | 9/2004 |
| WO | 2004/056009 A1 | 7/2004 |

OTHER PUBLICATIONS

3GPP TSG-RAN4 Meeting #44bis, R4-071574, "Requirements for the UE Transmission Power Headroom (UPH)"Oct. 8-12, 2007, pp. 1-3.

(Continued)

*Primary Examiner* — Guang Li
(74) *Attorney, Agent, or Firm* — Squire Sanders (US) LLP

(57) ABSTRACT

A method can include determining a power headroom report, and transmitting the headroom report. The power headroom report can provide both positive and negative values of power headroom according to the determination, in which negative values indicate the missing power in dB to fulfill requirements, such as those given by current resource allocation and modulation and coding scheme. This method can be implemented by encoding instructions for performing this method on a computer-readable medium, such that the instructions when execute cause the computer to execute the method as a computer process. The method can further include receiving a power headroom report. The method can additionally include allocating radio network resources based on the power headroom report.

16 Claims, 4 Drawing Sheets

(56) References Cited

U.S. PATENT DOCUMENTS

| | | | |
|---|---|---|---|
| 2008/0072079 A1* | 3/2008 | Bieswanger et al. | 713/300 |
| 2008/0175185 A1* | 7/2008 | Ji et al. | 370/318 |
| 2008/0254819 A1* | 10/2008 | Niwano et al. | 455/522 |
| 2009/0125650 A1* | 5/2009 | Sebire | 710/57 |
| 2009/0175187 A1* | 7/2009 | Jersenius et al. | 370/252 |
| 2009/0191910 A1* | 7/2009 | Athalye et al. | 455/522 |
| 2010/0173665 A1* | 7/2010 | Michel et al. | 455/522 |

OTHER PUBLICATIONS

3GPP TS 36.331 V8.0.0, "3rd Generation Partnership Project; Technical Specification Group Radio Access Network; Evolved Universal Terrestrial Radio Access (E-UTRA) Radio Resource Control (RRC); Protocol Specification (Release 8)", Dec. 2007, pp. 1-56.

3GPP TS 36.101 V8.0.0, "3rd Generation Partnership Project; Technical Specification Group Radio Access Network; Evolved Universal Terrestrial Radio Access (E-UTRA); User Equipment (UE) Radio Transmission and Reception (Release 8)", Dec. 2007, pp. 1-45.

International Search Report international application No. PCT/EP2009/053556 dated Sep. 28, 2009.

3GPP TS 36.213, v8.3.0, "3rd Generation Partnership Project; Technical Specification Group Radio Access Network; Evolved Universal Terrestrial Radio Access (E-UTRA); Physical Layer Procedures", Release 8, pp. 1-45, (May 2008).

WORU Notice of Allowance issued Sep. 14, 2012 in corresponding Application No. RU 201043473/08 (062617).

WOCN Office Action dated Dec. 4, 2012 in corresponding Application No. CN 200980119369.1.

* cited by examiner

EXTENSION OF POWER HEADROOM REPORTING AND TRIGGER CONDITIONS

CROSS REFERENCE TO RELATED APPLICATIONS

This application claims priority under 35 U.S.C. §119(e) of U.S. Provisional Patent Application Ser. No. 61/039,707, filed on Mar. 26, 2008. The subject matter of the earlier filed application is hereby incorporated by reference.

BACKGROUND OF THE INVENTION

1. Field of the Invention

Certain embodiments of the present invention generally relate to communication technologies. For example, certain embodiments of the present invention can be used in wireless communications, and particular in the Long Term Evolution (LTE) of Third Generation Partnership Project (3GPP) and Evolved UMTS (Universal Mobile Telecommunication System) Terrestrial Radio Access Network (Evolved UTRAN or simply EUTRAN). More particularly certain embodiments of the present invention provide an extension of power headroom reporting to be used by each and every user equipment (UE) to allow for a more efficient resource allocation by an evolved Node B (eNodeB).

2. Description of the Related Art

Third Generation Partnership Project (3GPP) Long Term Evolution (LTE), which is a project within the 3GPP to improve the UMTS standard with respect to efficiency, services, costs, new spectrum opportunities and better integration with other open standards. LTE may result in a new evolved Release 8 of the 3GPP standard including extensions and modifications of the UMTS system. The architecture is called EPS (Evolved Packet System) and comprehends E-UTRAN (Evolved UTRAN) on the access side and EPC (Evolved Packet Core) on the core side.

3GPP Release 8 is expected to be developed further. Much of the standard is expected to be oriented around upgrading UMTS to the fourth generation mobile communications technology, essentially a wireless broadband Internet system with voice and other services, such as data services, built on top.

In 3GPP standardization the specification for power headroom reporting for LTE has started and is expected to be defined. Power headroom reporting is currently topic of 3GPP standardization and the described problem has not yet been solved.

SUMMARY OF THE INVENTION

One embodiment of the present invention is an apparatus. The apparatus includes a processor configured to determine a power headroom report. The apparatus also includes a transmitter configured to transmit the headroom report. The processor is configured to determine the power headroom report with both positive and negative values of power headroom, as applicable, in which negative values indicate the missing power in dB to fulfill transmission requirements.

Another embodiment of the present invention is also an apparatus. The apparatus includes a receiver configured to receive a power headroom report. The apparatus further includes a processor configured to allocate radio network resources based on the power headroom report. The processor is configured to obtain both positive and negative values of power headroom from the power headroom report, as applicable, in which negative values indicate the missing power in dB to fulfill transmission requirements.

A further embodiment of the present invention is a method. The method includes determining a power headroom report. The method also includes transmitting the headroom report. The determining includes determining the power headroom report with both positive and negative values of power headroom, as applicable, in which negative values indicate the missing power in dB to fulfill transmission requirements.

An additional embodiment of the present invention is also a method. The method includes receiving a power headroom report. The method also includes allocating radio network resources based on the power headroom report. The allocating includes obtaining, from the power headroom report, both positive and negative values of power headroom, as applicable, in which negative values indicate the missing power in dB to fulfill transmission requirements.

Another embodiment of the present invention is a computer-readable storage medium encoded with instructions configured to control a computer to execute a process. The process includes determining a power headroom report. The process also includes transmitting the headroom report. The determining includes determining the power headroom report with both positive and negative values of power headroom, as applicable, in which negative values indicate the missing power in dB to fulfill transmission requirements.

A further embodiment of the present invention is a computer-readable storage medium encoded with instructions configured to control a computer to execute a process. The process includes receiving a power headroom report. The process also includes allocating radio network resources based on the power headroom report. The allocating includes obtaining, from the power headroom report, both positive and negative values of power headroom, as applicable, in which negative values indicate the missing power in dB to fulfill transmission requirements.

Another embodiment of the present invention is an apparatus. The apparatus includes determining means for determining a power headroom report. The apparatus also includes transmitting means for transmitting the headroom report. The determining means is configured to determine the power headroom report with both positive and negative values of power headroom, as applicable, in which negative values indicate the missing power in dB to fulfill transmission requirements.

An additional embodiment of the present invention is also an apparatus. The apparatus includes receiving means for receiving a power headroom report. The apparatus also includes allocating means for allocating radio network resources based on the power headroom report. The processor is configured to obtain both positive and negative values of power headroom from the power headroom report, as applicable, in which negative values indicate the missing power in dB to fulfill transmission requirements.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
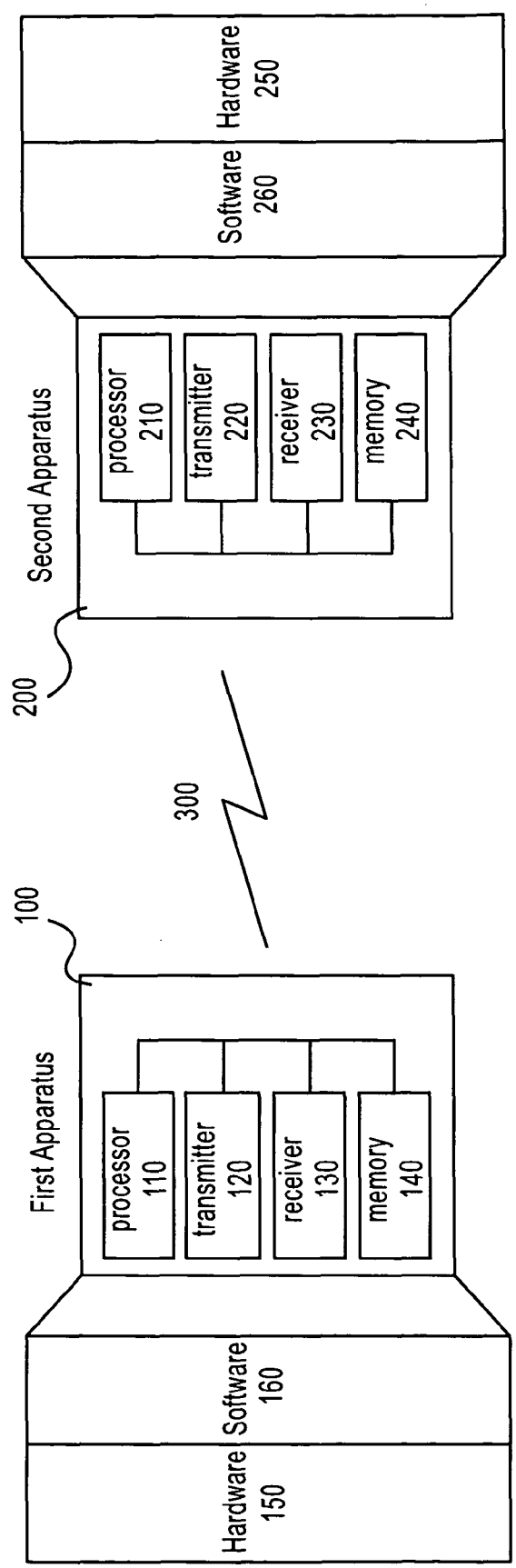
FIG. 1 illustrates a system according to an embodiment of the present invention.

Certain embodiments of the present invention relate to an extension of power headroom reporting to be used by each and every User Equipment (UE) to allow for a more economic resource allocation by an evolved Node B (eNodeB).

In such embodiments, the UE can report in a power headroom report the difference between the nominal maximum power and the power at the UE, e.g. the power that the UE would use if it did not apply maximum power limitations. This power headroom report describes only the positive difference between nominal maximum transmission power and the currently used power. Hence, with the current standardization assumption, the eNodeB will not have knowledge about the "missing" power at the UE. As a result resources on the air interface are somehow wasted since the scheduler is not aware of how much the UE power budget is exceeded.

Power headroom reporting can be performed in both directions, e.g. reporting (a) positive headroom if the current transmit power is lower than the nominal maximum transmission power and (b) negative headroom if the required transmit power according to the allocation scheme in terms of number of resource blocks, broadcasted and dedicated offset parameters, path loss estimates, as well as selected modulation and coding scheme and closed-loop power correction values requires higher power than the nominal maximum transmit power. It should be noted that the power headroom report is negative if the right part of the min-function in Equation 1 for Physical Uplink Shared Channel (discussed below) exceeds $P_{max}$. This part includes further terms (offset parameters, path loss estimates, and closed-loop power corrections). Example: The right part of the min-function requests a transmission power of 26 dBm. $P_{max}$ is set to 23 dBm. The reported power headroom is 23 dBm-26 dBm=−3 dB.

The extension of power headroom reporting to negative values can be used by the UE to inform the eNodeB about the amount of missing power in dB; eNodeB scheduler to reduce the number of allocated RBs to an optimum bandwidth and/or Adaptive Modulation and Coding (AMC) to adapt the modulation and coding scheme (MCS downgrade) in case of slow AMC, or outer loop link adaptation offset in case of fast AMC; adaptation of the UpLink (UL) power control; reconfiguration of UL sounding channel—if applicable; reconfiguration of signaling resources and power—if applicable; and rescaling of previous measurements—if applicable.

The currently proposed uplink in LTE uses Single Carrier Frequency Division Multiple Access (SC-FDMA) multiplexing and Quadrature Phase Shift Keying (QPSK) or 16 Quadrature Amplitude Modulation (QAM) (64 QAM optional) modulation. Power control can be an efficient means to improve the cell edge behavior, to relax the requirements on the intra-cell orthogonality, and to reduce inter-cell interference and power consumption. Basically, the Power Spectral Density (PSD) can be determined by an open loop power control component calculated at the User Equipment (UE) and a closed loop power control correction transmitted by the eNodeB. PSD can be defined as "transmission power per resource block," where a resource block (RB) is the smallest time/frequency unit that can be assigned by the scheduler. The setting of the UE transmit power according to 3GPP TS 36.213 (which is hereby incorporated by reference in its entirety) is based on broadcasted and dedicated parameters as well as path loss estimates. The maximum uplink transmit power is limited by a maximum value $P_{max}$ signaled from the network to the UE and by the capability of the UE according to its UE class.

The eNodeB can be configured to know at which PSD level the different UEs are operating. The PSD can be calculated from the total UE transmission power and the number of assigned physical resources. This information can be important for performing correct radio resource management and link quality control decisions at the eNodeB, especially for the adaptation of the modulation and coding scheme, UpLink (UL) power control and resource assignment. An imprecise knowledge of the PSD used by a specific UE could e.g. cause the allocation of an excessively high transmission bandwidth, thus resulting in a lower Signal to Interference plus Noise Ratio (SINR) than expected. Information on the PSD used at the UE is expected to be obtained from the power control headroom reports, which are current topics in 3GPP standardization.

The power control headroom is the difference between the nominal maximum transmission power and the power at the UE, e.g. the power that the UE would use if it did not apply maximum power limitations. The power control headroom is calculated per Transmission Time Interval (TTI) and it is expected that the UE sends power headroom reports after n closed loop power control commands, if the change of the path loss exceeds a specific threshold since the last power headroom report, if the UE is close to maximum power or if the timer started at previous report has elapsed. Periodic sending of power headroom report is also possible.

3GPP TS 36.213 defines the UE transmit power for the Physical Uplink Shared Channel (PUSCH) $P_{PUSCH}$ transmission in subframe i by the following equation:

Equation 1 for Physical Uplink Shared Channel (PUSCH)

$$P_{PUSCH}(i) = \min\{P_{MAX}, 10\log_{10}(M_{PUSCH}(i)) + P_{0\_PUSCH}(j) + \alpha \cdot PL + \Delta_{TF}(TF(i)) + f(i)\}[dBm]$$

where
- $P_{MAX}$ can be the maximum allowed power configured by higher layers;
- $M_{PUSCH}$ can be the size of the PUSCH resource assignment expressed in number of resource blocks valid for subframe i;
- $P_{0\_PUSCH}$ can be an offset parameter defined by Operation and Maintenance (O&M) or additionally influenced by internal calculations;
- $\alpha$ can be a path loss compensation factor adjustable by O&M;
- PL can be the downlink Path Loss (PL) estimate calculated in the UE;
- $\Delta_{TF}$ can be a Transport Format (TF) dependent offset; and
- f(i) can represent reporting of closed loop power correction values using accumulation or absolute values, respectively.

An alternative to Equation 1 is the following:

$$P_{PUSCH}(i) = \min\{P_{MAX}, 10\log_{10}(M_{PUSCH}(i)) + P_{0\_PUSCH}(j) + \alpha(j) \cdot PL + \Delta_{TF}(i) + f(i)\}$$

where the terms are defined as in Equation 1. Further changes are possible, for example, in which $P_{MAX}$ is defined by PCMAX=MIN(PEMAX, PUMAX), where PEMAX is the maximum allowed power configured by higher layers and defined in 3GPP TS 36.331 and PUMAX is the maximum UE power for the UE power class specified in 3GPP TS 36.101.

The UE can report in the power headroom report, the difference between $P_{MAX}$ and the second term of the minimum function in equation 1. This power headroom report (in the conventional implementation) describes only the positive difference between nominal maximum transmission power and the currently used power. Using maximum transmit power results in a power headroom of 0 dB but also requiring more power for maintaining the PSD at given allocation would result in a power headroom report of 0 dB. In other words, if more power than $P_{max}$ is required according to the right part of the min-function in equation 1, the power headroom without extension to negative values would also report the value 0 and the network does not obtain knowledge whether the uplink power is exactly sufficient (the right part of the min-function is equal to $P_{max}$) or if power is missing, i.e. the right part of the min-function is higher than $P_{max}$. Hence with the current standardization assumption the eNodeB is not expected to have knowledge about the "missing" power at the UE. As a result resources on the air interface may be wasted, since the scheduler is not aware of how much the UE power budget is exceeded.

In certain embodiments of the present invention, the power headroom reporting is extended to both directions, e.g. reporting (a) positive headroom if the current transmit power is lower than the nominal maximum transmission power and (b) negative headroom if the required transmit power according to the allocation scheme in terms of number of RBs as well as selected modulation and coding scheme requires higher power than the nominal maximum transmit power.

The extension of power headroom reporting to negative values can be used by
(a) the UE to inform the eNodeB about the amount of missing power in dB;
(b) an eNodeB scheduler to reduce the number of allocated RBs to an optimum bandwidth (ATB=adaptive transmission bandwidth) and/or adaptive modulation and coding (AMC) to adapt the modulation and coding scheme (MCS downgrade) in case of slow AMC, or outer loop link adaptation offset in case of fast AMC;
(c) adaptation of the UL power control;
(d) reconfiguration of UL sounding channel—if applicable;
(e) reconfiguration of signaling resources and power—if applicable; and
(f) rescaling of previous measurements—if applicable.

There can also be an emergency trigger condition, whenever the UE power is exceeded. The UE can send immediately a Power Headroom Report. The UE can, optionally, also be allowed to use only a limited number of resources for submission and can indicate this (or be told of this by, for example, an eNodeB). This may enhance high coverage.

There are also some further options. For example, if the UE runs out of power (required power according to allocation scheme exceeds $P_{MAX}$) it can reduce the number of RBs for uplink transmission, i.e. the UE can transmit on fewer RBs than scheduled. The eNodeB can be informed about this action. This option can be enabled or disabled by the network via broadcast message or dedicated signaling. For another example, if the UE runs out of power (required power according to allocation scheme exceeds $P_{MAX}$) and different $\Delta_{TF}$ values are used for different transport formats, the UE can use another, e.g. more robust modulation and coding scheme with lower $\Delta_{TF}$ and can signal this to the eNodeB. Enabling or disabling of this option can also be controlled by the network.

The extension of the reported range can lead to a more efficient utilization of the available resources. Without this solution, the PSD requirements from power control algorithm (according to 3GPP TS 36.213) at given resource allocation might not be maintained because an indicated power headroom of 0 dB does not provide information whether (or which) additional power is required. As a consequence, the quality requirements in terms of signal to interference and noise ratio (SINR) cannot be maintained, and a more robust modulation and coding scheme (MCS) would be expected to be selected by AMC, while the number of allocated RBs is still maintained.

At least some of the solutions described in present application allow the scheduler to reduce the resource allocation on the appropriate number of RBs, in a targeted, accurate way. Hence, radio resource management may have all necessary information to determine in advance the number of RBs to be reduced. The assignment of the gained RBs to other connections may become possible immediately, and the performance of LTE can be increased in terms of quality and capacity.

Certain embodiments of the present invention may result in a shift of the range covered by headroom reporting. The power control range in LTE is assumed to be 40 dB. With 6 bits used for signaling 64 power headroom, levels can be defined ranging from +40 dB to −23 dB in steps of 1 dB. This range can be extended, in terms of the lower limit of the range, from currently 0 dB to negative values. An extension to 3 dB can permit Adaptive Transmission Bandwidth (ATB) to reduce the bandwidth by 50%. Larger steps in bandwidth reduction can be provided by extending the range to e.g. −10 dB or −23 dB. This extension for the information of negative power headroom can be used by radio resource management to adapt the modulation scheme e.g. from 16 QAM to QPSK or from 64 QAM to 16 QAM (mapping on link level curves). A larger negative range can also allow for a higher granularity in each mixture of joint ATB and AMC measures. This is expected to provide sufficient range given by 6 bits for signaling. A shift of the range towards negative values could be similarly handled in case of a reduction of the signaling bits to e.g. 5.

Certain embodiments of the present invention extend the power headroom report from positive only to positive and negative values, where negative power headroom represents the following situation: the reported negative value indicates the missing power in dB to fulfill the requirements given by current resource allocation and modulation and coding scheme. This knowledge can allow an exact reassignment of the allocated resources and a more economic resource utilization.

FIG. 1 illustrates a system according to an embodiment of the present invention. The system includes a first apparatus 100 and a second apparatus 200. The first apparatus 100 and the second apparatus 200 can be configured to communicate over a communication link 300, which is illustrated as a direct wireless communication link, though there is no requirement that any connection between the first apparatus 100 and second apparatus 200 be either direct or wireless.

The first apparatus 100 can include a processor 110, a transmitter 120, a receiver 130, and optionally a memory 140. The first apparatus 100 can be, for example, a UE, such as a personal digital assistant, a handheld computer, a cellular telephone, or other communication device. The first apparatus can be implemented as a combination of hardware 150 and software 160. The hardware 150 can be, for example, a general purpose computer or an Application Specific Integrated Circuit (ASIC). The optional memory 140 can be any conventional memory, such as flash Random Access Memory (RAM), a Compact Disk (CD), or a hard drive.

The processor 110 can be configured to determine a power headroom report. The transmitter 120 can be configured to transmit the headroom report. The power headroom report itself can be configured to provide both positive and negative values of power headroom according to the determination of the processor, in which negative values indicate the missing power in dB to fulfill transmission requirements such as, for example, the requirements given by at least one of resource allocation, modulation scheme, coding scheme, offset parameters, path loss estimates, or closed-loop power correction values. By "both . . . and . . . according to the determination," it should be understood that in certain embodiments of the present invention, this is implemented by providing a positive value (only) if the determination yields a positive value and a negative value (only) if the determination yields a negative value. It is not necessarily required that both a positive value and a negative value be simultaneously present in a given power report.

The second apparatus 200 can include a processor 210, a transmitter 220, a receiver 230, and optionally a memory 240. The second apparatus 200 can be, for example, a base station, access point, router, or evolved Node B. The second apparatus can be implemented as a combination of hardware 250 and software 260. The hardware 250 can be, for example, a general purpose computer or an Application Specific Integrated Circuit (ASIC). The optional memory 240 can be any conventional memory, such as flash Random Access Memory (RAM), a Compact Disk (CD), or a hard drive.

The receiver 230 can be configured to receive a power headroom report. The processor 210 can be configured to allocate radio network resources based on the power headroom report. The power headroom report itself can be configured to provide both positive and negative values of power headroom according to the determination of the processor, in which negative values indicate the missing power in dB to fulfill transmission requirements such as, for example, requirements given by at least one of resource allocation, modulation scheme, coding scheme, offset parameters, path loss estimates, or closed-loop power correction values.

Figure 2:
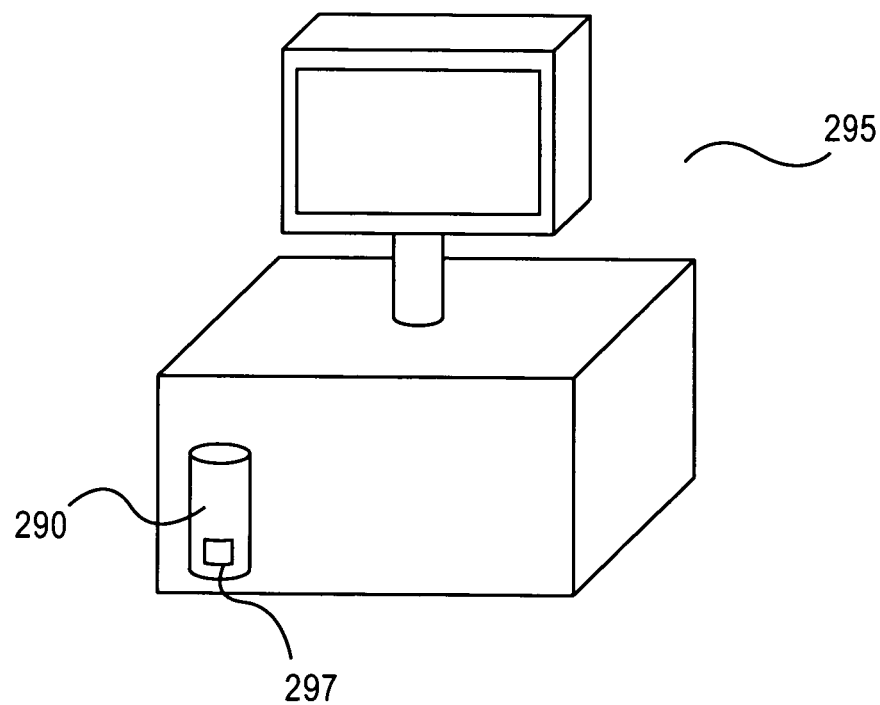
FIG. 2 illustrates a computer-readable medium according to an embodiment of the present invention.

FIG. 2 illustrates a computer-readable medium according to an embodiment of the present invention. A computer-readable medium 290 (such as a hard disk drive, CD-Read Only Memory (CD-ROM), or Electronically Programmable ROM (EPROM)—other forms of computer readable media are not excluded) can be encoded with instructions that cause a computer 295 to execute a process when the instructions are executed. The instructions can include a power headroom report 297 in which a power headroom on a range that includes negative and positive power headroom is expressible. The power headroom report 297 can include a value that is either positive or negative. Whether the value is positive or negative can be determined by processor of, for example, a user equipment. The value provided in the power headroom report 297 can instruct the processor of, for example, an eNodeB, to allocate resources in a particular way.

Figure 3:
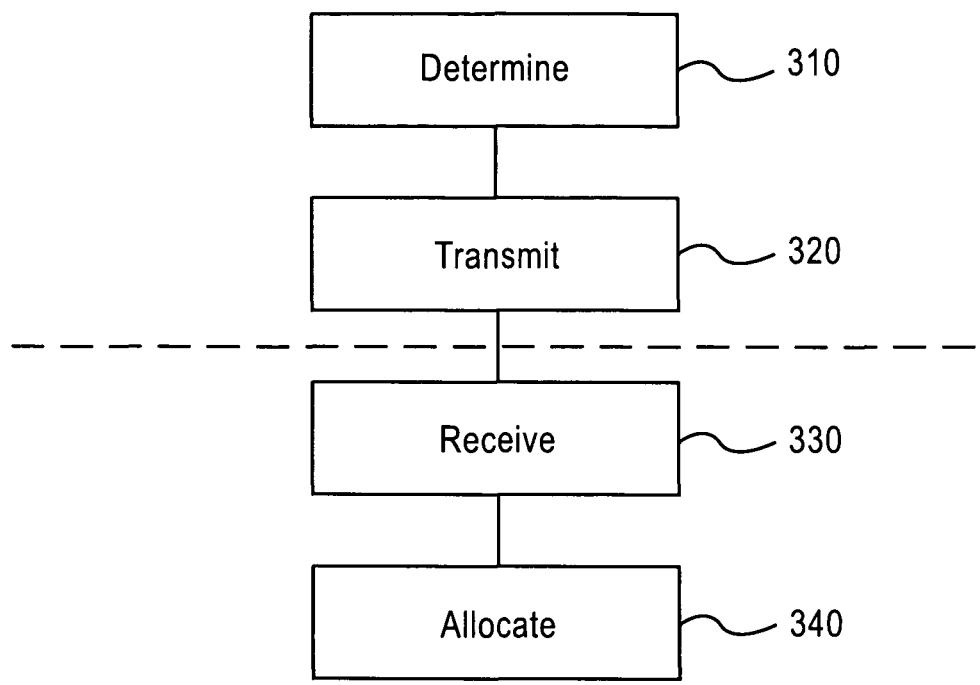
FIG. 3 illustrates a method according to an embodiment of the present invention.

FIG. 3 illustrates a method according to an embodiment of the present invention. The method can include determining 310 a power headroom report. The method can also include transmitting 320 the headroom report. The power headroom report can provide both positive and negative values of power headroom according to the determination, in which negative values indicate the missing power in dB to fulfill transmission requirements such as, for example, requirements given by at least one of resource allocation, modulation scheme, coding scheme, offset parameters, path loss estimates, or closed-loop power correction values. This method can be implemented by encoding instructions for performing this method on a computer-readable medium, such that the instructions when execute cause the computer to execute the method as a computer process.

The method can further include receiving 330 a power headroom report. The method can additionally include allocating 340 radio network resources based on the power headroom report.

The present invention has been described mainly in terms of a user equipment (UE) interacting with an evolved Node B (eNodeB). It should be understood, however, that this implementation is merely an example. Other implementations could be made, such as by substituting personal computers (PCs) for both the UE and the eNodeB. Additionally, though in some places the system is described as containing only a single UE and only a single eNodeB, it should be understood that the system could be implemented with either multiple UEs or multiple eNodeBs or both.

Figure 4:
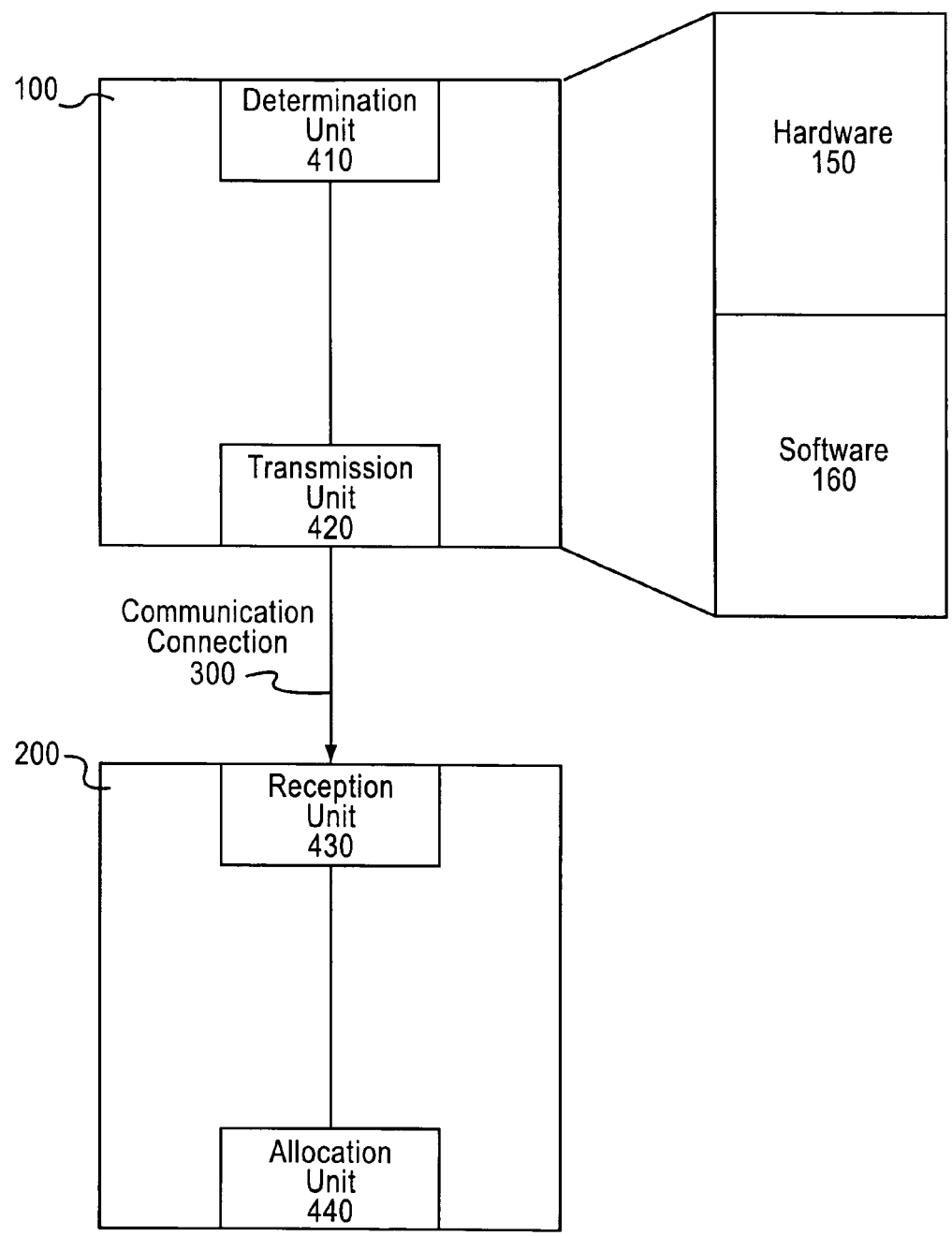
FIG. 4 illustrates a system according to another embodiment of the present invention.

FIG. 4 illustrates a system according to an embodiment of the present invention. The system includes a first apparatus 100 and a second apparatus 200. The first apparatus 100 and the second apparatus 200 can be configured to communicate over a communication link 300, which is illustrated as a direct communication link, though there is no requirement that any connection between the first apparatus 100 and second apparatus 200 be a direct connection.

The first apparatus 100 can be implemented as a combination of hardware 150 and software 160. The hardware 150 can be, for example, a general purpose computer or an Application Specific Integrated Circuit (ASIC). Likewise, the second apparatus 200 can be similar constructed.

The first apparatus 100 can include a determination unit 410 configured to determine a power headroom report. The first apparatus can also include a transmission unit 420 configured to transmit the headroom report. The power headroom report itself can be configured to provide both positive and negative values of power headroom according to the determination of the determination unit 410, in which negative values indicate the missing power in dB to fulfill transmission requirements such as, for example, requirements given by at least one of resource allocation, modulation scheme, coding scheme, offset parameters, path loss estimates, or closed-loop power correction values. By "both . . . and . . . according to the determination," it should be understood that in certain embodiments of the present invention, this is implemented by providing a positive value (only) if the determination yields a positive value and a negative value (only) if the determination yields a negative value. It is not necessarily required that both a positive value and a negative value be simultaneously present in a given power report.

The second apparatus 200 can include a reception unit 430 configured to receive a power headroom report. The second apparatus 200 can also include an allocation unit 440 configured to allocate radio network resources based on the power headroom report. The power headroom report itself can be configured to provide both positive and negative values of power headroom according to the determination of the processor, in which negative values indicate the missing power in dB to fulfill transmission requirements such as, for example, requirements given by at least one of resource allocation, modulation scheme, coding scheme, offset parameters, path loss estimates, or closed-loop power correction values.

The various units (410, 420, 430, and 440) of the first apparatus 100 and the second apparatus 200 can be implemented in hardware, optionally together with software. Thus, for example, a general purpose processor can be configured to serve as an allocation unit 440 when it is performing allocation, and the same general purpose processor can serve as a reception unit 430 when it is receiving a signal that includes a power headroom report. Alternatively, two or more processors or other devices can be configured to serve as the various units (410, 420, 430, and 440), in particular implementations.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention, which is defined by the appended claims.

We claim:

1. An apparatus, comprising:
a processor configured to determine a power headroom report; and
a transmitter configured to transmit the headroom report,
wherein the processor is configured to determine the power headroom report with both positive and negative values of power headroom, as applicable, in which negative values indicate the missing power in dB to fulfill transmission requirements, and
wherein the processor is configured to determine the power headroom by subtracting the nominal maximum transmission power and the power that the apparatus would use if it did not apply maximum power limitations, wherein the result of said subtracting is not limited to zero and positive values.

2. The apparatus of claim 1, wherein the apparatus comprises a user equipment.

3. The apparatus of claim 1, wherein the processor is configured to determine the power headroom report comprising a 6 bit report configured to identify a level selected from a range of +40 to −23 dB, in 1 dB steps.

4. An apparatus, comprising:
a receiver configured to receive a power headroom report;
a processor configured to allocate radio network resources based on the power headroom report,
wherein the processor is configured to obtain both positive and negative values of power headroom from the power headroom report, as applicable, in which negative values indicate the missing power in dB to fulfill transmission requirements,
wherein the processor is configured to allocate additional radio network resources to a user equipment when the power headroom indicates positive headroom, when applicable, and to allocate fewer radio network resources to the user equipment when the power headroom report indicates negative headroom.

5. The apparatus of claim 4, wherein the apparatus comprises an enhanced node B.

6. The apparatus of claim 4, wherein the processor is configured to obtain, from the power headroom report, a 6 bit report configured to identify a level selected from a range of +40 to −23 dB, in 1 dB steps.

7. A method, comprising:
determining a power headroom report; and
transmitting the headroom report,
wherein the determining comprises determining the power headroom report with both positive and negative values of power headroom, as applicable, in which negative values indicate the missing power in dB to fulfill transmission requirements, and
wherein the determining comprises determining the power headroom by subtracting the nominal maximum transmission power and the power that the apparatus would use if it did not apply maximum power limitations, wherein the result of said subtracting is not limited to zero and positive values.

8. The method of claim 7, wherein the method is performed by a user equipment.

9. The method of claim 7, further comprising: configuring the power headroom report as a 6 bit report configured to identify a level selected from a range of +40 to −23 dB, in 1 dB steps.

10. A method, comprising:
receiving a power headroom report;
allocating radio network resources based on the power headroom report,
wherein the allocating comprises obtaining, from the power headroom report, both positive and negative values of power headroom, as applicable, in which negative values indicate the missing power in dB to fulfill transmission requirements,
wherein the allocating radio resources comprises allocating additional radio network resources to a user equipment when the power headroom indicates positive headroom, when applicable, and to allocate fewer radio network resources to the user equipment when the power headroom report indicates negative headroom.

11. The method of claim 10, wherein the method is performed by an enhanced node B.

12. The method of claim 10, further comprising: obtaining, from the power headroom report, a 6 bit report configured to identify a level selected from a range of +40 to −23 dB, in 1 dB steps.

13. A non-transitory computer-readable storage medium encoded with instructions configured to control a computer to execute a process, the process including:
determining a power headroom report; and
transmitting the headroom report,
wherein the determining comprises determining the power headroom report with both positive and negative values of power headroom, as applicable, in which negative values indicate the missing power in dB to fulfill transmission requirements, and
wherein the determining comprises determining the power headroom by subtracting the nominal maximum transmission power and the power that the apparatus would use if it did not apply maximum power limitations, wherein the result of said subtracting is not limited to zero and positive values.

14. A non-transitory computer-readable storage medium encoded with instructions configured to control a computer to execute a process, the process including:
receiving a power headroom report;
allocating radio network resources based on the power headroom report,
wherein the allocating comprises obtaining, from the power headroom report, both positive and negative values of power headroom, as applicable, in which negative values indicate the missing power in dB to fulfill transmission requirements,
wherein the allocating radio resources comprises allocating additional radio network resources to a user equipment when the power headroom indicates positive headroom, when applicable, and to allocate fewer radio network resources to the user equipment when the power headroom report indicates negative headroom.

15. An apparatus, comprising:
determining means for determining a power headroom report; and
transmitting means for transmitting the headroom report,
wherein the determining means is configured to determine the power headroom report with both positive and negative values of power headroom, as applicable, in which negative values indicate the missing power in dB to fulfill transmission requirements, and wherein the determining means is configured to determine the power headroom by subtracting the nominal maximum transmission power and the power that the apparatus would use if it did not apply maximum power limitations, wherein the result of said subtracting is not limited to zero and positive values.

16. An apparatus, comprising:

receiving means for receiving a power headroom report;

allocating means for allocating radio network resources based on the power headroom report, wherein the allocating means is configured to obtain both positive and negative values of power headroom from the power headroom report, as applicable, in which negative values indicate the missing power in dB to fulfill transmission requirements, wherein the allocating means is configured to allocate additional radio network resources to a user equipment when the power headroom indicates positive headroom, when applicable, and to allocate fewer radio network resources to the user equipment when the power headroom report indicates negative headroom.

* * * * *